US012650936B1

(12) United States Patent
McAllister et al.

(10) Patent No.:  US 12,650,936 B1
(45) Date of Patent:         Jun. 9, 2026

(54) CHIPLET-BASED MULTI-CHIP MODULE WITH DIE-TO-DIE (D2D) INTERFACE THAT EMPLOYS BANDWIDTH BALANCING CIRCUITRY

(71) Applicant: Eliyan Corporation, Santa Clara, CA (US)

(72) Inventors: Curtis McAllister, Los Altos, CA (US); Paul Hylander, Bellevue, WA (US); Ramin Farjadrad, Los Altos, CA (US); Syrus Ziai, Los ALtos, CA (US)

(73) Assignee: Eliyan Corp., Santa Clara, CA (US)

( * ) Notice: Subject to any disclaimer, the term of this patent is extended or adjusted under 35 U.S.C. 154(b) by 65 days.

(21) Appl. No.: 18/908,596

(22) Filed: Oct. 7, 2024

Related U.S. Application Data

(60) Provisional application No. 63/543,037, filed on Oct. 6, 2023.

(51) Int. Cl.
*G06F 13/16* (2006.01)

(52) U.S. Cl.
CPC ...... *G06F 13/1684* (2013.01); *G06F 13/1668* (2013.01); *G06F 13/1678* (2013.01)

(58) Field of Classification Search
CPC ............. G06F 13/1684; G06F 13/1668; G06F 13/1678
See application file for complete search history.

(56) References Cited

U.S. PATENT DOCUMENTS

| | | | |
|---|---|---|---|
| 4,334,305 A | 6/1982 | Girardi |
| 5,396,581 A | 3/1995 | Mashiko |

| | | | |
|---|---|---|---|
| 5,677,569 A | 10/1997 | Choi |
| 5,892,287 A | 4/1999 | Hoffman |
| 5,910,010 A | 6/1999 | Nishizawa |
| 6,031,729 A | 2/2000 | Berkely |
| 6,055,235 A | 4/2000 | Blanc |

(Continued)

OTHER PUBLICATIONS

Block Memory Generator v8.2 LogiCORE IP Product Guide Vivado Design Suite; Xilinx; Apr. 1, 2015.

(Continued)

*Primary Examiner* — Tracy A Warren

(74) *Attorney, Agent, or Firm* — Lance Kreisman; Peninsula Patent Group

(57) ABSTRACT

A memory chiplet includes storage and multiple memory control circuits. Each of the multiple memory control circuits to control a memory access operation to the storage. Multiple channel circuits are employed in the memory chiplet to transfer channel data between the multiple memory control circuits and the storage at a channel bandwidth. Multiple link input/output (I/O) circuits couple the memory chiplet to a host integrated circuit (IC) chiplet. Each of the multiple link I/O circuits transfer link data at a link bandwidth that is free to be different than the channel bandwidth. Bandwidth balancing circuitry, based on relative values between the channel bandwidth and the link bandwidth, selectively configures the multiple channels to transfer a total amount of data at a fully-available link bandwidth of the multiple links or selectively configure the multiple links to transfer the total amount of data at a fully-available channel bandwidth of the multiple channels.

20 Claims, 6 Drawing Sheets

(56) References Cited

U.S. PATENT DOCUMENTS

| | | | |
|---|---|---|---|
| 6,417,737 | B1 | 7/2002 | Moloudi |
| 6,492,727 | B2 | 12/2002 | Nishizawa |
| 6,690,742 | B2 | 2/2004 | Chan |
| 6,721,313 | B1 | 4/2004 | Van Duyne |
| 6,932,618 | B1 | 8/2005 | Nelson |
| 7,027,529 | B1 | 4/2006 | Ohishi |
| 7,248,890 | B1 | 7/2007 | Raghavan |
| 7,269,212 | B1 | 9/2007 | Chau |
| 7,477,615 | B2 | 1/2009 | Oshita |
| 7,535,958 | B2 | 5/2009 | Best |
| 7,593,271 | B2 | 9/2009 | Ong |
| 7,701,957 | B1 | 4/2010 | Bicknell |
| 7,907,469 | B2 | 3/2011 | Sohn et al. |
| 7,978,754 | B2 | 7/2011 | Yeung |
| 8,004,330 | B1 | 8/2011 | Acimovic |
| 8,024,142 | B1 | 9/2011 | Gagnon |
| 8,121,541 | B2 | 2/2012 | Rofougaran |
| 8,176,238 | B2 | 5/2012 | Yu et al. |
| 8,468,381 | B2 | 6/2013 | Jones |
| 8,483,579 | B2 | 7/2013 | Fukuda |
| 8,546,955 | B1 | 10/2013 | Wu |
| 8,704,364 | B2 | 4/2014 | Banijamali et al. |
| 8,861,573 | B2 | 10/2014 | Chu |
| 8,904,077 | B1 * | 12/2014 | Alston .................. G06F 1/3253 709/239 |
| 8,948,203 | B1 | 2/2015 | Nolan |
| 8,982,905 | B2 | 3/2015 | Kamble |
| 9,088,334 | B2 | 7/2015 | Chakraborty |
| 9,106,229 | B1 | 8/2015 | Hutton |
| 9,129,935 | B1 | 9/2015 | Chandrasekar |
| 9,294,313 | B2 | 3/2016 | Prokop |
| 9,349,707 | B1 | 5/2016 | Sun |
| 9,379,878 | B1 | 6/2016 | Lugthart |
| 9,432,298 | B1 | 8/2016 | Smith |
| 9,558,143 | B2 | 1/2017 | Leidel |
| 9,832,006 | B1 | 11/2017 | Bandi |
| 9,842,784 | B2 | 12/2017 | Nasrullah |
| 9,843,538 | B2 | 12/2017 | Woodruff |
| 9,886,275 | B1 | 2/2018 | Carlson |
| 9,934,842 | B2 | 4/2018 | Mozak |
| 9,961,812 | B2 | 5/2018 | Suorsa |
| 9,977,731 | B2 | 5/2018 | Pyeon |
| 10,171,115 | B1 | 1/2019 | Shirinfar |
| 10,402,363 | B2 | 9/2019 | Long et al. |
| 10,410,694 | B1 | 9/2019 | Arbel |
| 10,439,661 | B1 | 10/2019 | Heydari |
| 10,642,767 | B1 | 5/2020 | Farjadrad |
| 10,678,738 | B2 | 6/2020 | Dai |
| 10,735,176 | B1 | 8/2020 | Heydari |
| 10,748,852 | B1 | 8/2020 | Sauter |
| 10,769,073 | B2 | 9/2020 | Desai |
| 10,803,548 | B2 | 10/2020 | Matam et al. |
| 10,804,204 | B2 | 10/2020 | Rubin et al. |
| 10,825,496 | B2 | 11/2020 | Murphy |
| 10,826,536 | B1 | 11/2020 | Beukema |
| 10,855,498 | B1 | 12/2020 | Farjadrad |
| 10,935,593 | B2 | 3/2021 | Goyal |
| 11,088,876 | B1 | 8/2021 | Farjadrad |
| 11,100,028 | B1 | 8/2021 | Subramaniam |
| 11,164,817 | B2 | 11/2021 | Rubin et al. |
| 11,204,863 | B2 | 12/2021 | Sheffler |
| 11,581,282 | B2 | 2/2023 | Elshirbini |
| 11,669,474 | B1 | 6/2023 | Lee |
| 11,782,865 | B1 | 10/2023 | Kochavi |
| 11,789,649 | B2 | 10/2023 | Chatterjee et al. |
| 11,841,815 | B1 | 12/2023 | Farjadrad |
| 11,842,986 | B1 | 12/2023 | Ramin |
| 11,855,043 | B1 | 12/2023 | Farjadrad |
| 11,855,056 | B1 | 12/2023 | Rad |
| 11,892,242 | B2 | 2/2024 | Mao |
| 11,893,242 | B1 | 2/2024 | Farjadrad |
| 11,983,125 | B2 | 5/2024 | Soni |
| 12,001,355 | B1 | 6/2024 | Dreier |
| 12,001,725 | B2 | 6/2024 | Chatterjee |
| 2002/0122479 | A1 | 9/2002 | Agazzi |
| 2002/0136315 | A1 | 9/2002 | Chan |
| 2004/0088444 | A1 | 5/2004 | Baumer |
| 2004/0113239 | A1 | 6/2004 | Prokofiev |
| 2004/0130347 | A1 | 7/2004 | Moll |
| 2004/0156461 | A1 | 8/2004 | Agazzi |
| 2005/0041683 | A1 | 2/2005 | Kizer |
| 2005/0134306 | A1 | 6/2005 | Stojanovic |
| 2005/0157781 | A1 | 7/2005 | Ho |
| 2005/0205983 | A1 | 9/2005 | Origasa |
| 2006/0060376 | A1 | 3/2006 | Yoon |
| 2006/0103011 | A1 | 5/2006 | Andry |
| 2006/0158229 | A1 | 7/2006 | Hsu |
| 2006/0181283 | A1 | 8/2006 | Wajcer |
| 2006/0188043 | A1 | 8/2006 | Zerbe |
| 2006/0250985 | A1 | 11/2006 | Baumer |
| 2006/0251194 | A1 | 11/2006 | Bublil |
| 2007/0281643 | A1 | 12/2007 | Kawai |
| 2008/0063395 | A1 | 3/2008 | Royle |
| 2008/0086282 | A1 | 4/2008 | Artman |
| 2008/0143422 | A1 | 6/2008 | Lalithambika |
| 2008/0186987 | A1 | 8/2008 | Baumer |
| 2008/0222407 | A1 | 9/2008 | Carpenter |
| 2009/0113158 | A1 | 4/2009 | Schnell |
| 2009/0154365 | A1 | 6/2009 | Diab |
| 2009/0174448 | A1 | 7/2009 | Zabinski |
| 2009/0220240 | A1 | 9/2009 | Abhari |
| 2009/0225900 | A1 | 9/2009 | Yamaguchi |
| 2009/0304054 | A1 | 12/2009 | Tonietto |
| 2010/0177841 | A1 | 7/2010 | Yoon |
| 2010/0197231 | A1 | 8/2010 | Kenington |
| 2010/0294547 | A1 | 11/2010 | Hatanaka |
| 2011/0029803 | A1 | 2/2011 | Redman-White |
| 2011/0038286 | A1 | 2/2011 | Ta |
| 2011/0167297 | A1 | 7/2011 | Su |
| 2011/0187430 | A1 | 8/2011 | Tang |
| 2011/0204428 | A1 | 8/2011 | Erickson |
| 2011/0267073 | A1 | 11/2011 | Chengson |
| 2011/0293041 | A1 | 12/2011 | Luo |
| 2012/0082194 | A1 | 4/2012 | Tam |
| 2012/0182776 | A1 | 7/2012 | Best |
| 2012/0192023 | A1 | 7/2012 | Lee |
| 2012/0216084 | A1 | 8/2012 | Chun |
| 2012/0327818 | A1 | 12/2012 | Takatori |
| 2013/0181257 | A1 | 7/2013 | Ngai |
| 2013/0222026 | A1 | 8/2013 | Havens |
| 2013/0249290 | A1 | 9/2013 | Buonpane |
| 2013/0285584 | A1 | 10/2013 | Kim |
| 2014/0016524 | A1 | 1/2014 | Choi |
| 2014/0048947 | A1 | 2/2014 | Lee |
| 2014/0126613 | A1 | 5/2014 | Zhang |
| 2014/0192583 | A1 | 7/2014 | Rajan |
| 2014/0269860 | A1 | 9/2014 | Brown |
| 2014/0269983 | A1 | 9/2014 | Baeckler |
| 2015/0012677 | A1 | 1/2015 | Nagarajan |
| 2015/0046612 | A1 | 2/2015 | Gupta |
| 2015/0172040 | A1 | 6/2015 | Pelekhaty |
| 2015/0180760 | A1 | 6/2015 | Rickard |
| 2015/0206867 | A1 | 7/2015 | Lim |
| 2015/0271074 | A1 | 9/2015 | Hirth |
| 2015/0326348 | A1 | 11/2015 | Shen |
| 2015/0358005 | A1 | 12/2015 | Chen |
| 2016/0056125 | A1 | 2/2016 | Pan |
| 2016/0071818 | A1 | 3/2016 | Wang |
| 2016/0111406 | A1 | 4/2016 | Mak |
| 2016/0217872 | A1 | 7/2016 | Hossain |
| 2016/0294585 | A1 | 10/2016 | Rahman |
| 2017/0255575 | A1 | 9/2017 | Niu |
| 2017/0286340 | A1 | 10/2017 | Ngo |
| 2017/0317859 | A1 | 11/2017 | Hormati |
| 2017/0331651 | A1 | 11/2017 | Suzuki |
| 2018/0010329 | A1 | 1/2018 | Golding, Jr. |
| 2018/0082981 | A1 | 3/2018 | Gowda |
| 2018/0137005 | A1 | 5/2018 | Wu |
| 2018/0175001 | A1 | 6/2018 | Pyo |
| 2018/0190635 | A1 | 7/2018 | Choi |
| 2018/0196767 | A1 | 7/2018 | Linstadt |
| 2018/0210830 | A1 | 7/2018 | Malladi et al. |
| 2018/0315735 | A1 | 11/2018 | Delacruz |
| 2019/0044764 | A1 | 2/2019 | Hollis |

(56) References Cited

U.S. PATENT DOCUMENTS

| | | | |
|---|---|---|---|
| 2019/0058457 A1 | 2/2019 | Ran | |
| 2019/0108111 A1 | 4/2019 | Levin | |
| 2019/0198489 A1 | 6/2019 | Kim | |
| 2019/0267062 A1 | 8/2019 | Tan | |
| 2019/0319626 A1 | 10/2019 | Dabral | |
| 2020/0051961 A1 | 2/2020 | Rickard | |
| 2020/0105718 A1 | 4/2020 | Collins et al. | |
| 2020/0183874 A1* | 6/2020 | Savoj | G06F 9/526 |
| 2020/0257619 A1 | 8/2020 | Sheffler | |
| 2020/0320026 A1 | 10/2020 | Kabiry | |
| 2020/0356488 A1* | 11/2020 | Malladi | G11C 11/417 |
| 2020/0364142 A1 | 11/2020 | Lin | |
| 2020/0373286 A1 | 11/2020 | Dennis | |
| 2021/0056058 A1 | 2/2021 | Lee | |
| 2021/0082875 A1 | 3/2021 | Nelson | |
| 2021/0117102 A1 | 4/2021 | Grenier | |
| 2021/0149763 A1 | 5/2021 | Ranganathan | |
| 2021/0181974 A1 | 6/2021 | Ghosh | |
| 2021/0183842 A1 | 6/2021 | Fay | |
| 2021/0193567 A1 | 6/2021 | Cheah et al. | |
| 2021/0225827 A1 | 7/2021 | Lanka | |
| 2021/0258078 A1 | 8/2021 | Meade | |
| 2021/0311900 A1 | 10/2021 | Malladi | |
| 2021/0365203 A1 | 11/2021 | O | |
| 2021/0405919 A1 | 12/2021 | K | |
| 2022/0051989 A1 | 2/2022 | Agarwal | |
| 2022/0121381 A1 | 4/2022 | Brewer | |
| 2022/0159860 A1 | 5/2022 | Winzer | |
| 2022/0179792 A1 | 6/2022 | Banerjee | |
| 2022/0189934 A1 | 6/2022 | Kim | |
| 2022/0222198 A1 | 7/2022 | Lanka | |
| 2022/0223522 A1 | 7/2022 | Scearce | |
| 2022/0237138 A1 | 7/2022 | Lanka | |
| 2022/0254390 A1 | 8/2022 | Gans | |
| 2022/0327276 A1 | 10/2022 | Seshan | |
| 2022/0334995 A1 | 10/2022 | Das Sharma | |
| 2022/0342840 A1 | 10/2022 | Das Sharma | |
| 2022/0350756 A1 | 11/2022 | Burstein | |
| 2022/0391114 A1 | 12/2022 | Richter | |
| 2023/0039033 A1 | 2/2023 | Zarkovsky | |
| 2023/0068802 A1 | 3/2023 | Wang | |
| 2023/0090061 A1 | 3/2023 | Zarkovsky | |
| 2023/0092541 A1 | 3/2023 | Dugast | |
| 2023/0161599 A1 | 5/2023 | Erickson | |
| 2023/0181599 A1 | 6/2023 | Du et al. | |
| 2023/0289311 A1 | 9/2023 | Noguera Serra | |
| 2023/0359579 A1 | 11/2023 | Madhira | |
| 2024/0007234 A1 | 1/2024 | Harrington | |
| 2024/0028208 A1 | 1/2024 | Kim | |
| 2024/0241840 A1 | 7/2024 | Im | |
| 2024/0273041 A1 | 8/2024 | Lee | |
| 2025/0225087 A1* | 7/2025 | Brewer | G06F 13/1684 |

OTHER PUBLICATIONS

Kurt Lender et al., "Questions from the Compute Express Link Exploring Coherent Memory and Innovative Cases Webinar", Apr. 13, 2020, CXL consortium.

Planet Analog, "The basics of SerDes (serializers/deserializers) for interfacing", Dec. 1, 2020, Planet Analog.

Quartus II Handbook Version 9.0 vol. 4: SOPC Builder; "System Interconnect Fabric for Memory-Mapped Interfaces"; Mar. 2009.

Farjadrad et al., "A Bunch of Wires (BOW) Interface for Inter-Chiplet Communication", 2019 IEEE Symposium on High-Performance Interconnects (HOTI), pp. 27-30, Oct. 2019.

Universal Chiplet Interconnect Express (UCIe) Specification Rev. 1.0, Feb. 24, 2022.

Brinda Ganesh et al., "Fully-Buffered DIMM Memory Architectures: Understanding Mechanisms, Overheads and Scaling", 2007, IEEE, 2007 IEEE 13th International Symposium on High Performance Computer Architecture, pp. 1-12 (Year: 2007).

Anu Ramamurthy, "Chiplet Technology & Heterogeneous Integration" Jun. 2021, NASA, 2021 NEPP ETW, slides 1-17 (Year: 2021).

Wikipedia, "Printed circuit board", Nov. 9, 2021, Wayback Machine, as preserved by the Internet Archive on Nov. 9, 2021, pp. 1-23 (Year: 2021).

"Hot Chips 2017: Intel Deep Dives Into EMIB", TomsHardware. com; Aug. 25, 2017.

"Using Chiplet Encapsulation Technology to Achieve Processing-In-Memory Functions"; Micromachines 2022, 13, 1790; https://www.mdpi.com/journal/micromachines; Tian et al.

"Multiport memory for high-speed interprocessor communication in MultiCom;" Scientia Iranica, vol. 8, No. 4, pp. 322-331; Sharif University of Technology, Oct. 2001; Asgari et al.

U.S. Appl. No. 16/812,234; Mohsen F. Rad, filed Mar. 6, 2020.

Universal Chiplet Interconnect Express (UCIe) Specification, Revision 1.1, Version 1.0, Jul. 10, 2023.

Hybrid Memory Cube Specification 2.1, Hybrid Memory Cube Consortium, HMC-30G-VSR PHY, 2014.

* cited by examiner

Figure 1:
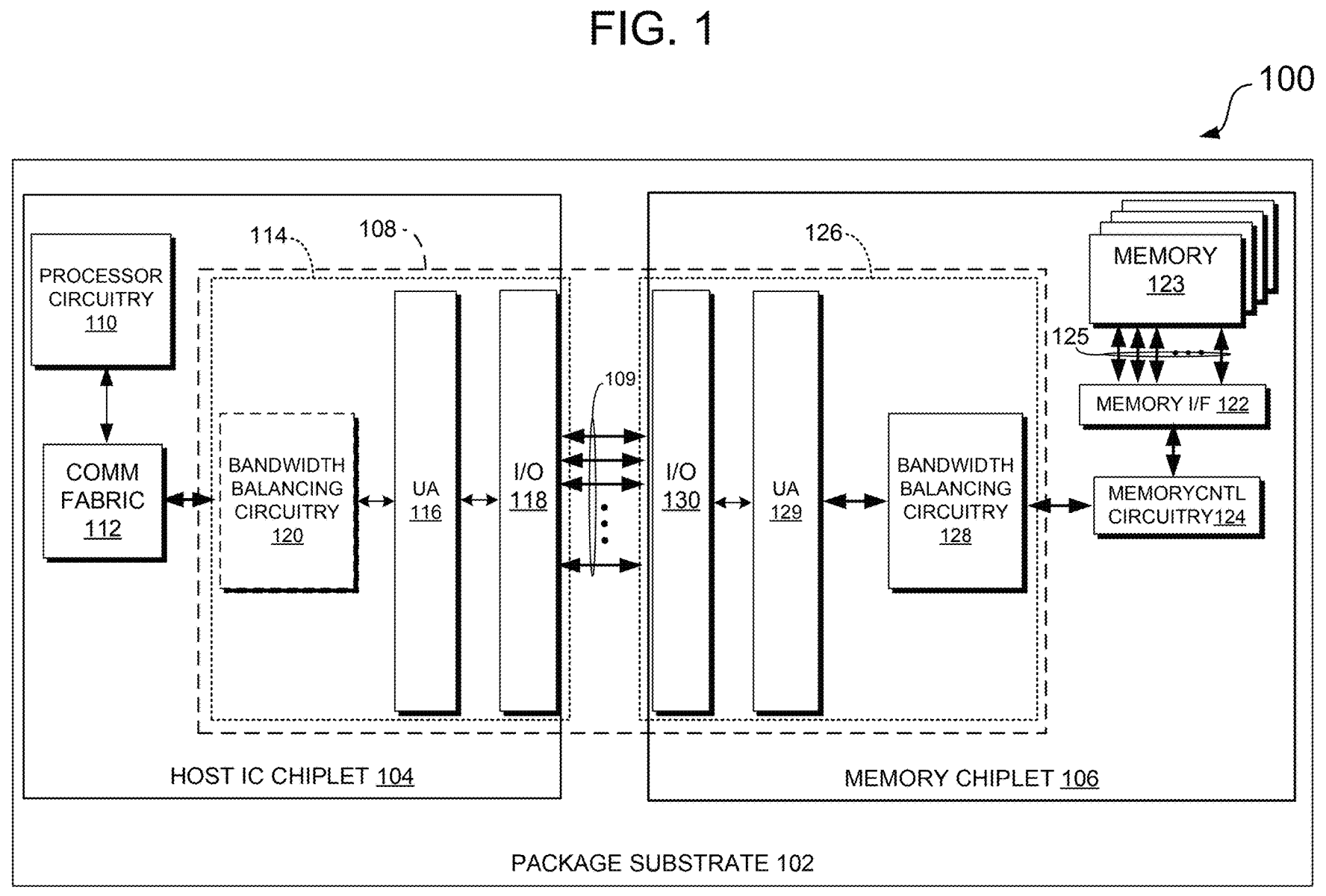

PACKAGE SUBSTRATE 102

MEMORY CHIPLET 106

MEMORY 123

MEMORY I/F 122

MEMORYCNTL CIRCUITRY124

125

126

BANDWIDTH BALANCING CIRCUITRY 128

UA 129

I/O 130

109

HOST IC CHIPLET 104

108

114

I/O 118

UA 116

BANDWIDTH BALANCING CIRCUITRY 120

PROCESSOR CIRCUITRY 110

COMM FABRIC 112

FIG. 2

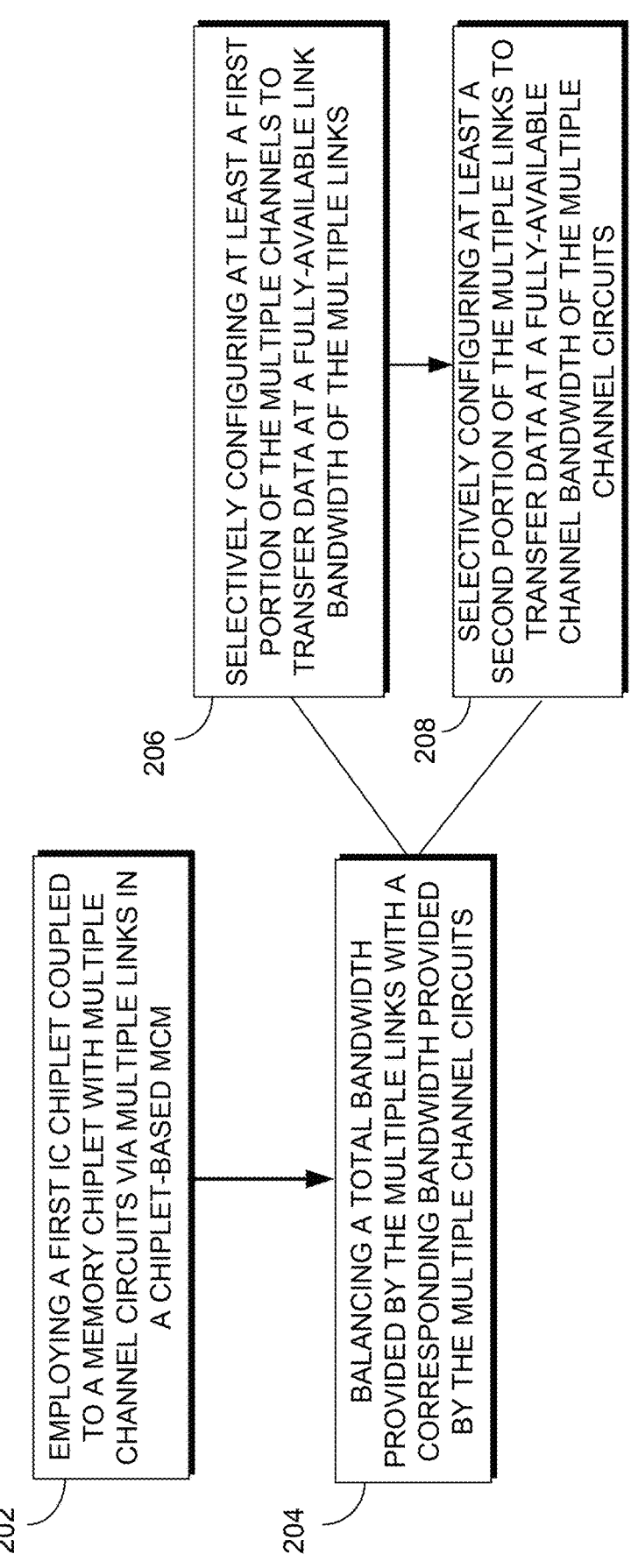

202 — EMPLOYING A FIRST IC CHIPLET COUPLED TO A MEMORY CHIPLET WITH MULTIPLE CHANNEL CIRCUITS VIA MULTIPLE LINKS IN A CHIPLET-BASED MCM

204 — BALANCING A TOTAL BANDWIDTH PROVIDED BY THE MULTIPLE LINKS WITH A CORRESPONDING BANDWIDTH PROVIDED BY THE MULTIPLE CHANNEL CIRCUITS

206 — SELECTIVELY CONFIGURING AT LEAST A FIRST PORTION OF THE MULTIPLE CHANNELS TO TRANSFER DATA AT A FULLY-AVAILABLE LINK BANDWIDTH OF THE MULTIPLE LINKS

208 — SELECTIVELY CONFIGURING AT LEAST A SECOND PORTION OF THE MULTIPLE LINKS TO TRANSFER DATA AT A FULLY-AVAILABLE CHANNEL BANDWIDTH OF THE MULTIPLE CHANNEL CIRCUITS

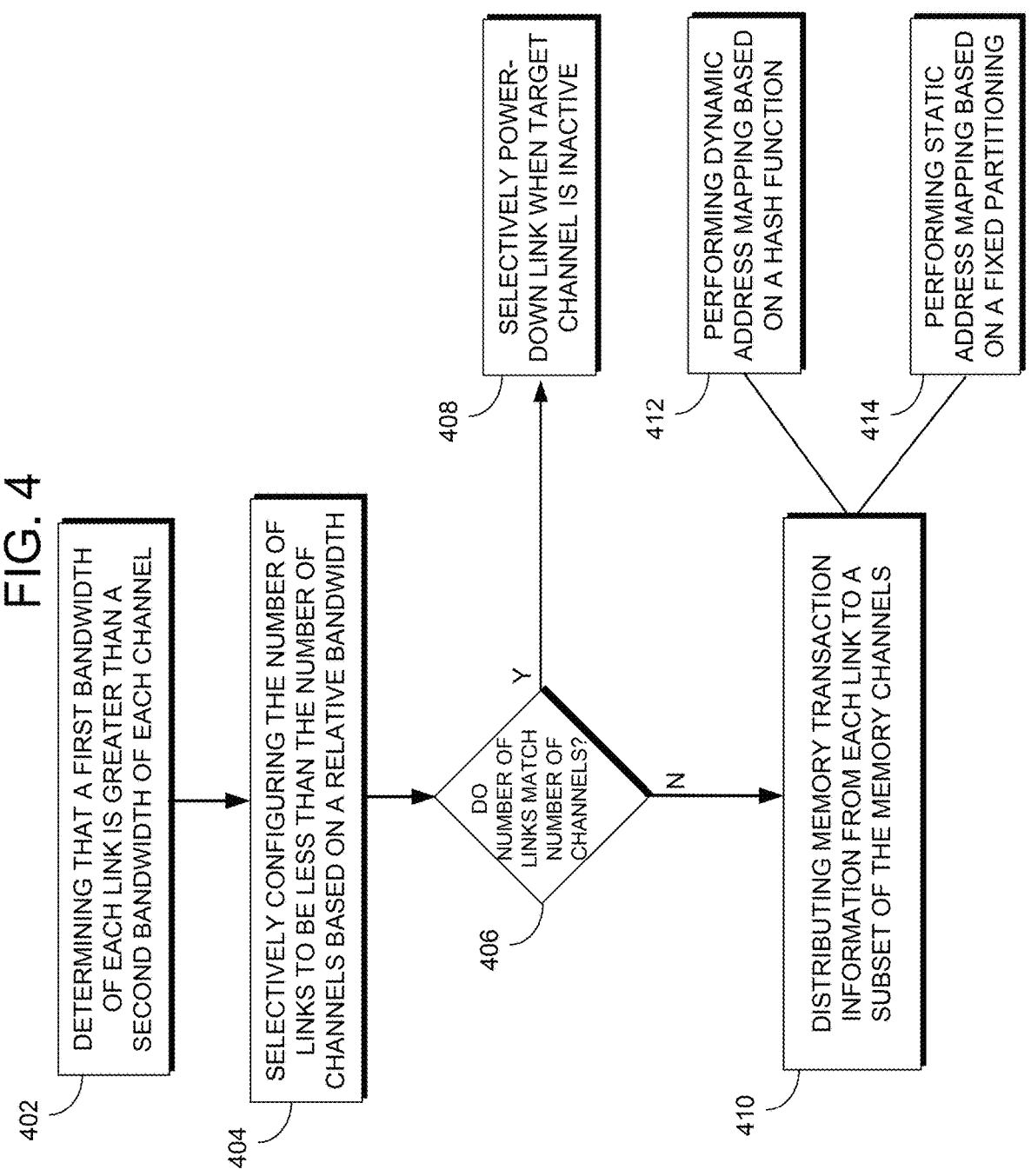

402 — DETERMINING THAT A FIRST BANDWIDTH OF EACH LINK IS GREATER THAN A SECOND BANDWIDTH OF EACH CHANNEL

404 — SELECTIVELY CONFIGURING THE NUMBER OF LINKS TO BE LESS THAN THE NUMBER OF CHANNELS BASED ON A RELATIVE BANDWIDTH

406 — DO NUMBER OF LINKS MATCH NUMBER OF CHANNELS?

Y — 408 — SELECTIVELY POWER-DOWN LINK WHEN TARGET CHANNEL IS INACTIVE

N — 410 — DISTRIBUTING MEMORY TRANSACTION INFORMATION FROM EACH LINK TO A SUBSET OF THE MEMORY CHANNELS

412 — PERFORMING DYNAMIC ADDRESS MAPPING BASED ON A HASH FUNCTION

414 — PERFORMING STATIC ADDRESS MAPPING BASED ON A FIXED PARTITIONING

FIG. 5

702 — DETERMINING THAT A LINK BANDWIDTH OF EACH LINK IS LESS THAN A CHANNEL BANDWIDTH OF EACH CHANNEL

704 — CONFIGURING VIRTUAL LINKS THAT COMBINE PORTIONS OF MULTIPLE PHYSICAL LINKS, EACH VIRTUAL LINK COMPRISING A BANDWIDTH CORRESPONDING TO THE CHANNEL BANDWIDTH OF EACH CHANNEL

CHIPLET-BASED MULTI-CHIP MODULE WITH DIE-TO-DIE (D2D) INTERFACE THAT EMPLOYS BANDWIDTH BALANCING CIRCUITRY

CROSS-REFERENCE TO RELATED APPLICATIONS

This application is a Non-Provisional that claims priority to U.S. Provisional Application No. 63/543,037, filed Oct. 6, 2023, entitled PACKET-BASED DRAM INTERFACE ON DIE-TO-DIE PHY, which is incorporated herein by reference in its entirety.

TECHNICAL FIELD

The disclosure herein relates to semiconductor devices, packaging and associated methods.

BACKGROUND

As integrated circuit (IC) chips such as system on chips (SoCs) become larger, the yields realized in manufacturing the chips become smaller. Decreasing yields for larger chips increases overall costs for chip sellers. To address the yield problem, chiplet architectures have been proposed that favor a modular approach to SoCs. The solution employs smaller sub-processing die, known as chiplets, each containing a well-defined subset of functionality. Chiplets thus allow for dividing a complex design, such as a high-end processor or networking chip, into several small die instead of one large monolithic die.

When accessing memory, traditional chiplet architectures often employ relatively large and complex die-to-die (D2D) interfaces for transferring data between the chiplet and a specific memory type. While beneficial in certain circumstances, many conventional D2D interfaces are typically designed to support a variety of applications. Using generic interfaces specifically for memory applications in a chiplet context is often non-optimal, with sacrifices in bandwidth, area, latency and power efficiency often made in the interests of wider interface applicability.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 1 illustrates a high-level top plan view of a chiplet-based multi-chip module (MCM), including a first integrated circuit (IC) chiplet that is coupled to a memory chiplet via multiple links and which employs bandwidth balancing circuitry to balance a total bandwidth between the multiple links and multiple memory channels associated with the memory chiplet.

FIG. 2 illustrates a flowchart of steps for one embodiment of a method of operating the chiplet-based MCM of FIG. 1.

FIG. 3 illustrates one specific embodiment of the chiplet-based MCM of FIG. 1 in a context where a first bandwidth of each of the multiple links is greater than a second bandwidth of each of the memory channels, and employing address mapping circuitry to balance the total bandwidth between the multiple links and multiple memory channels associated with the memory chiplet.

FIG. 4 illustrates a flowchart of steps for one embodiment of a method of operating the chiplet-based MCM of FIG. 3.

FIG. 5 illustrates a further embodiment of a chiplet-based MCM that is similar to the embodiment of FIG. 3, in a context where the first bandwidth of each of the multiple links is less than the second bandwidth of each of the memory channels, and employing virtual lane control circuitry to balance the total bandwidth between the multiple links and multiple memory channels associated with the memory chiplet.

DETAILED DESCRIPTION

Figure 6:
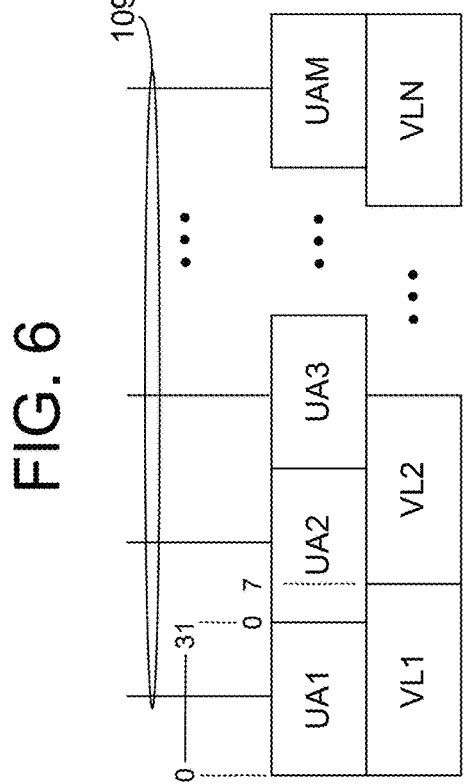
FIG. 6 illustrates a block diagram to show a relative spatial configuration of virtual link widths to default link widths.

Semiconductor devices, packaging architectures and associated methods are disclosed. In one embodiment, a chiplet-based multi-chip module (MCM) for coupling to a base substrate is disclosed. The chiplet-based MCM includes a package substrate that is separate from the base substrate. A first integrated circuit (IC) chiplet and a memory chiplet are coupled to the chiplet-based MCM. The memory chiplet includes storage and multiple memory control circuits. Each of the multiple memory control circuits controls a memory access operation to the storage. Multiple channel circuits are employed in the memory chiplet, with each of the multiple channel circuits to transfer channel data between the multiple memory control circuits and the storage at a channel bandwidth. Multiple links couple the memory chiplet to the host integrated circuit (IC) chiplet. Each of the multiple links transfers link data at a link bandwidth that is free to be different than the channel bandwidth. Bandwidth balancing circuitry, based on relative values between the channel bandwidth and the link bandwidth, selectively configures the multiple channels to transfer a total amount of data at a fully-available link bandwidth of the multiple links or selectively configures the multiple links to transfer the total amount of data at a fully-available channel bandwidth of the multiple channels. By balancing the total bandwidth through selectively configuring the multiple links and/or the multiple channels, bandwidth constraints placed on individual links or individual channels may be overcome, resulting in higher bandwidth utilization efficiencies.

In another embodiment, a memory chiplet includes storage and multiple memory control circuits. Each of the multiple memory control circuits to control a memory access operation to the storage. Multiple channel circuits are employed in the memory chiplet, with each of the multiple channel circuits to transfer channel data between the multiple memory control circuits and the storage at a channel bandwidth. Multiple link input/output (I/O) circuits couple the memory chiplet to a host integrated circuit (IC) chiplet. Each of the multiple link I/O circuits transfer link data at a link bandwidth that is free to be different than the channel bandwidth. Bandwidth balancing circuitry, based on relative values between the channel bandwidth and the link bandwidth, selectively configures the multiple channels to transfer a total amount of data at a fully-available link bandwidth of the multiple link I/O circuits or selectively configures the multiple link I/O circuits to transfer the total amount of data at a fully-available channel bandwidth of the multiple channels.

Throughout the disclosure provided herein, the term chiplet-based multi-chip module (MCM) is used to represent a packaged semiconductor device that incorporates multiple semiconductor die or sub-packages in a single unitary package. A chiplet-based MCM may also be referred to as a system in a package (SiP). The unpackaged bare die or sub-packages that are interconnected in an MCM or SiP are referred to herein as chiplets. Packaged die that are disposed external to a chiplet-based MCM or SiP, such as being mounted on a printed circuit board (PCB), are referred to herein as chips.

FIG. 1 illustrates one embodiment of a chiplet-based MCM, generally designated 100, that employs a package substrate 102 for mounting a host integrated circuit (IC) chiplet 104 and a memory chiplet 106. The package substrate 102 is coupled to a base substrate (not shown), such as a printed circuit board. Die-to-die (D2D) interface circuitry 108 interconnects the host IC chiplet 104 to the memory chiplet 106 via multiple signaling links 109. For one embodiment, the D2D interface circuitry takes the form of a Universal Memory Interface (UMI) such as that disclosed in U.S. patent application Ser. No. 18/652,675, filed May 1, 2024, titled UNIVERSAL MEMORY INTERFACE, assigned to the assignee of the present disclosure and expressly incorporated herein by reference. For other embodiments, the D2D interface circuitry 108 may take the form of an interface compliant with the universal Chiplet Interconnect Express (UCIe) D2D interface standard, the Bunch of Wires (BoW) interconnect standard, or the like.

With continued reference to FIG. 1, the host IC chiplet 104 generally includes processor circuitry 110 or other logic that performs operations on data, with the need to periodically carry out read and write data transfers with the memory chiplet 106. The processor circuitry 110 may take the form of one or more processors such as a computer processing unit (CPU), graphics processing unit (GPU), tensor processing unit (TPU), artificial intelligence (AI) processing circuitry, field-programmable gate array (FPGA) circuitry or other form of host chiplet with a need to access memory.

Further referring to FIG. 1, the host IC chiplet 104 may include a communications fabric 112 for controlling communications on-chip, and for also controlling how the host IC chiplet 104 communicates off-chip with other chiplets, such as the memory chiplet 106. For one embodiment, the communications fabric 112 includes network-on-chip (NoC) circuitry, such as that disclosed in U.S. patent Ser. No. 18/528,702, filed Dec. 4, 2023, titled: "UNIVERSAL NETWORK-ATTACHED MEMORY ARCHITECTURE", owned by the assignee of the instant application and expressly incorporated herein by reference.

With continued reference to FIG. 1, the host IC chiplet 104 includes a host-side portion 114 of the D2D interface circuitry 108. For one embodiment, the host-side portion 114 includes host UMI adapter (UA) circuitry 116 and host input/output (I/O) circuitry 118. The host I/O circuitry 118 includes host-side transmit and receive circuitry to support transmission and/or reception of information between the host IC chiplet 104 and the memory chiplet 106 via the multiple signaling links 109, which are organized in a manner more fully described below. For some embodiments, host-side bandwidth balancing circuitry 120 is employed to selectively configure virtual links from the multiple signaling links 109 in an effort to optimize a total available bandwidth that is available from the memory chiplet 106.

Further referring to FIG. 1, for one embodiment, the memory IC chiplet 106 includes memory-centric interface circuitry 122 for accessing memory 123 via multiple memory channels 125. The memory 123 may be realized by one from a variety of different memory standards or types, such as high-bandwidth memory (HBM), double-data rate (DDR) memory, low-power double data rate (LPDDR), graphics double data rate (GDDR), to name but a few. For one embodiment, memory control circuitry 124 is positioned on the memory chiplet 106 to remove the need for the host IC chiplet 104 (often a costly application-specific integrated circuit) to know the type of memory being accessed. This generally frees the host IC chiplet 104 to interact with a variety of memory types, and unconstrained to interact with solely one type of memory associated with a specific on-chip memory controller.

For one embodiment, the memory chiplet 106 includes a memory-side portion 126 of the overall D2D interface circuitry 108. For one embodiment, the memory-side portion 126 includes memory-side bandwidth balancing circuitry 128 similar to the host-side bandwidth balancing circuitry 120. As described more fully below, for one embodiment, the memory-side bandwidth balancing circuitry 128 is capable of determining the total available bandwidths of the multiple links versus the multiple memory channels, and based on the difference between the total available bandwidths, selectively configures one or both of the links and/or channels to provide the highest total bandwidth possible between the chiplets 104 and 106. The memory chiplet 106 also includes memory-side UMI adapter circuitry 129 and memory-side input/output (I/O) circuitry 130. The memory-side I/O circuitry 130 includes transmit and receive circuitry for supporting the multiple signaling links 109, and that generally corresponds to the host-side D2D I/O circuitry 118.

For some embodiments, the memory chiplet 106 may take the form of a single-die chiplet that includes the memory control circuitry 124, the memory-centric interface 122, and the features of the memory interface sub-circuit 126. The single-die chiplet may then be employed as a base die upon which are stacked multiple memory die to form the memory 123 for a stacked memory implementation, such as for HBM. Other embodiments may employ the single die chiplet as a buffer or intermediary between the IC chiplet 104 and memory die 123, with the memory die 123 disposed proximate the single die chiplet on the package substrate 102 or off-MCM (not shown).

In operation, and depending on the application, a link bandwidth (in terms of data rate) for each link may not match a channel bandwidth associated with each channel. Conventional D2D interfaces that typically match a given fixed unit interface architecture (such as the UCIe standardized 64b unit architecture) to a given channel with bandwidth imbalances thus often fail to take advantage of the fully-available bandwidth of the system. To avoid bandwidth underutilization, and referring now to FIG. 2, the chiplet-based MCM 100 generally employs the first IC chiplet 104 coupled to the multi-channel memory chiplet 106 via the multiple links 109, at 202. A fully-available link bandwidth provided by the multiple configurable links is then balanced with a corresponding bandwidth provided by the multiple channels, at 204. For one embodiment, at 206, where a first bandwidth associated with each link is greater than a second bandwidth associated with each channel, the bandwidth balancing circuitry 128 of the memory chiplet 106 selectively configures at least a first portion of the multiple channels to transfer data at the fully-available link bandwidth of the multiple links. In another embodiment, at 208, where the first bandwidth associated with each link is less than a second bandwidth associated with each channel, the bandwidth balancing circuitry 120 and 128 selectively configures at least a portion of the multiple links to transfer data at a fully-available channel bandwidth of the multiple channels. Further detail for each of these embodiments is set forth below.

Figure 3:
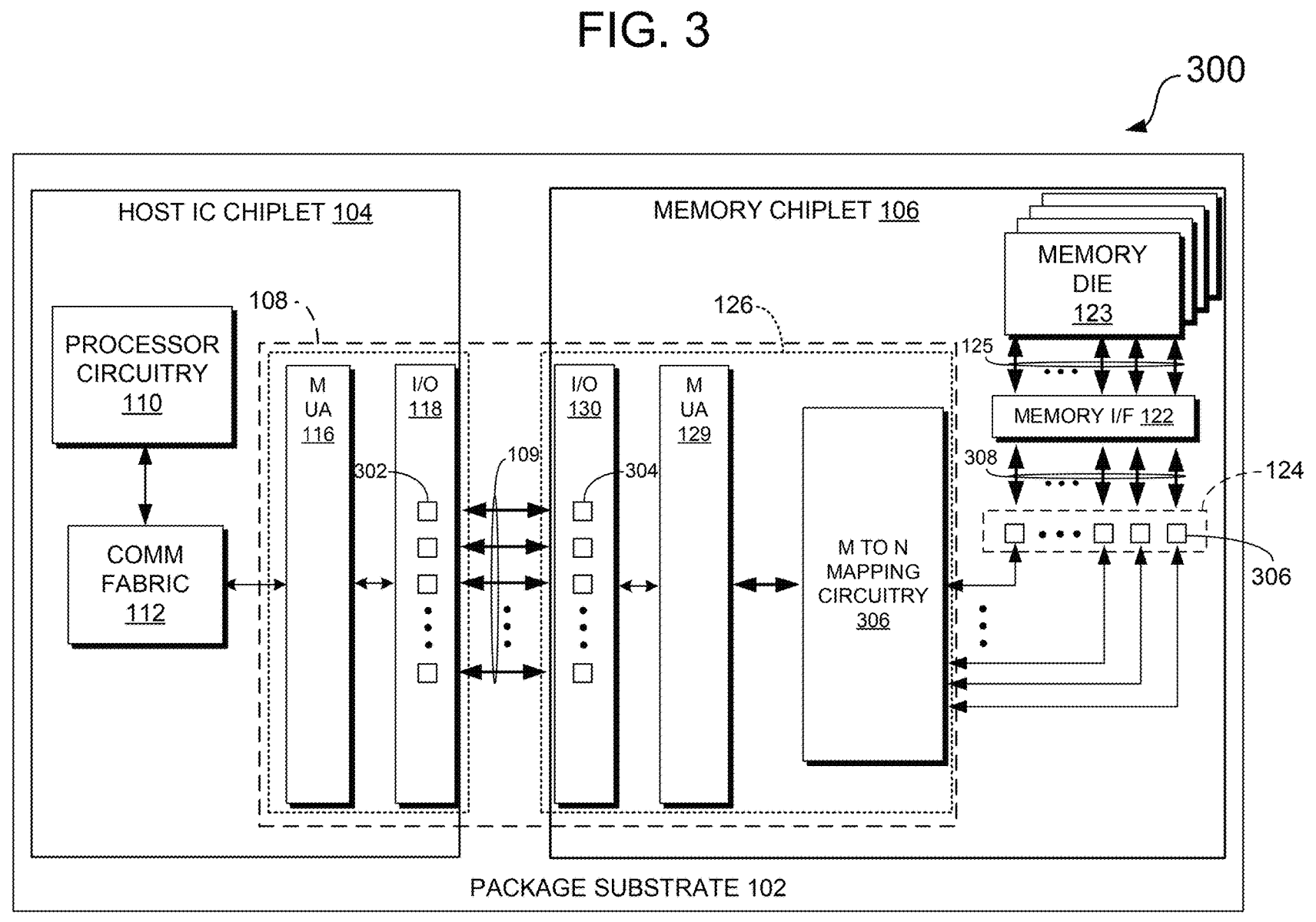

FIG. 3 illustrates a chiplet-based MCM, generally designated 300, that includes many of the features that are incorporated into the embodiment of FIG. 1, with like features identified by the corresponding numerals presented in FIG. 1. For one specific embodiment, the memory chiplet 106 communicates with the host IC chiplet 104 via "M" links 109, with a corresponding number of "M" I/O circuits 302 included in the host-side I/O circuitry 118 and "M" I/O circuits 304 included at the memory-side I/O circuitry 130. For one embodiment, the memory control circuitry 124 is configured such that a "N" separate memory controllers 306 manage memory transactions over "N" corresponding channels 308. Generally, a channel is an independent interface that is capable of accessing an independent set of one or more memory banks in the memory 123.

The specific embodiment of FIG. 3 addresses situations where a usable link bandwidth, defined as a raw data rate of a link less the overhead involved with request fields, response fields and data formatting constraints, is greater than the bandwidth of a single channel (or the corresponding independent set of banks) of the memory chiplet 106. To avoid underutilization of each link, the memory chiplet 106 employs bandwidth balancing circuitry 306 that takes the form of memory mapping circuitry. The memory mapping circuitry 306 generally distributes memory requests from each link of the multiple links 109 to a subset (more than one) of the memory channels 125, and vice versa. In an overall bandwidth context, this balances the higher bandwidth capabilities of the individual links 109 with the relatively lower bandwidth capabilities of the memory channels 125. As explained more fully below, this may be accomplished dynamically or statically.

Further referring to FIG. 3, the M-to-N mapping circuitry 306 may take one of several embodiments, depending on the application. For one specific embodiment, the mapping may be dynamic through use of a hash function capability that evaluates incoming requests (such as data requests) and creates an index that identifies addressing information for distributing the various requests across the available channels. Distributed requests are tagged with appropriate addressing information based on the hash function, with the tag information being stored in the memory with the data, so that the data may be properly reassembled as read data in a read response operation. Crossbar switch circuitry (not shown) may be included, in some embodiments, to route a stream of data from a single input to multiple distributed outputs. By distributing requests from each link across a subset of the channels, the links are able to collectively realize a total available bandwidth even though the link bandwidth for each individual link is greater than the channel bandwidth of each individual channel.

For some embodiments, a static mapping capability may be preferred over the dynamic hash-based mapping functionality described above. Static mapping may be achieved for one embodiment by pre-configuring the links to route data in a partitioned manner to fixed regions of the memory space served by sub-sets of the channels. This avoids the use of hash-functions and the underlying processing resources used to carry out the hash function.

In operation, and referring now to FIG. 4, the chiplet-based MCM 300 of FIG. 3 is configured based on a determination, at 402, that a link bandwidth of each link is greater than a channel bandwidth of each channel. The number of links is then selectively configured, at 404, to either match the number of channels (such as when the relative link and channel bandwidths are very close), or to be less than the number of channels. If the number of links match the number of channels, at 406, then a selective power reduction capability may be enabled that powers-down target channels when a corresponding link is inactive, at 408. Where the number of configured links is less than the number of channels, at 406, then memory request information from each link is distributed to a subset (more than one) of the memory channels, at 410. This may take the form of dynamic hash-based address distributing, at 412, or static address mapping based on fixed partitioning, at 414.

Figure 5:
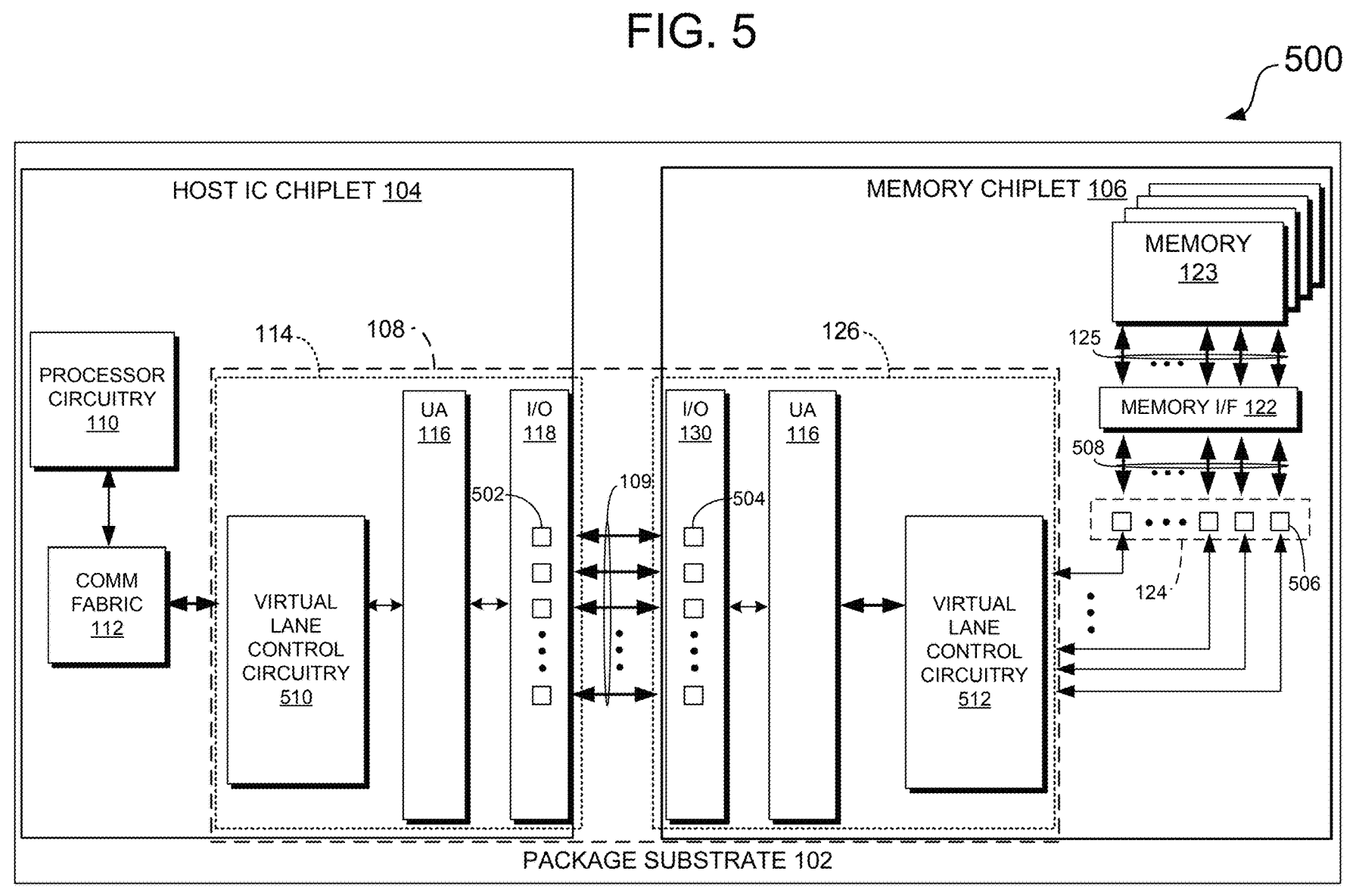

While the chiplet-based MCM embodiment 300 described above with respect to FIGS. 3 and 4 addresses bandwidth balancing situations where the link bandwidth of each link is greater than the channel bandwidth of each channel, the opposite situation where the link bandwidth of each link is less than the channel bandwidth of each channel is addressed by a further embodiment of a chiplet-based MCM, generally designated 500, that is illustrated in FIG. 5. The chiplet-based MCM 500 includes many of the features that are incorporated into the embodiment of FIG. 1, with like features identified by the corresponding numerals presented in FIG. 1. For one specific embodiment, the memory chiplet 106 communicates with the host IC chiplet 104 via "M" links 109, with a corresponding number of "M" I/O circuits 502 included in the host-side I/O circuitry 118 and "M" I/O circuits 504 included in the memory-side I/O circuitry 130. For one embodiment, the memory control circuitry 124 is configured such that "N" separate memory controllers 506 manage memory transactions over "N" corresponding channels 508.

The specific embodiment of FIG. 5 addresses situations where a usable link bandwidth, defined as the raw data rate of a link less the overhead involved with request fields, response fields and data formatting constraints, is less than the bandwidth of a single channel (or the corresponding independent set of banks) of the memory chiplet 106. To avoid underutilization of each channel, both the host IC chiplet 104 and the memory chiplet 106 employ bandwidth balancing circuitry 510 and 512 that takes the form of virtual lane control circuitry. The virtual lane control circuitry 510 and 512 generally combines portions of two or more links to form larger virtual links.

As an example, and referring now to FIG. 6, for a situation where the number of links M is five (5), and the number of channels N is four (4), then each memory channel may be configured to utilize 5/4 the bandwidth of one link. For an actual link configuration having a unit architecture width of thirty-two (32) bits, then bits 0-31 of a first actual link UA1 may be combined with bits 0-7 of a second actual link UA2 (such as an adjacent link) to create a first 40-bit wide virtual link VL1. A second virtual link VL2 may be configured from bits 8-31 of the second actual link UA2 along with bits 0-15 of a third actual link UA3, and so on. FIG. 6 illustrates five UMI adapter blocks that are coupled to corresponding thirty-two-bit links, with the virtual lane control circuitry 510 and 512 each configuring forty-bit virtual links to feed information at a virtual link bandwidth that matches (or corresponds to) the channel bandwidth for each channel.

Figure 7:
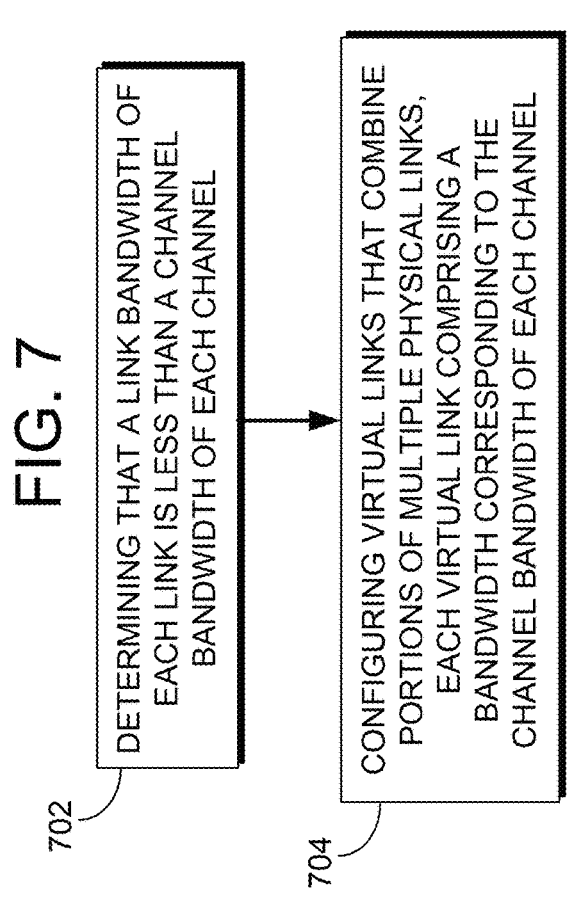
FIG. 7 illustrates a flowchart of steps for one embodiment of a method of operating the chiplet-based MCM of FIG. 5.

In operation, and referring now to FIG. 7, the chiplet-based MCM 500 of FIG. 5 is configured based on a determination, at 702, that a link bandwidth of each link is less than a channel bandwidth of each channel. Virtual links are then configured, at 704, that combine portions of multiple default links, where each virtual link supports a bandwidth corresponding to the channel bandwidth of each channel.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present disclosure. In some instances, the terminology and symbols may imply specific details that are not required to practice aspects of the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low level for active-low signals or high logic level for active-high signals (or discharged to low logic state or charged to a high logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While aspects of the disclosure have been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A chiplet-based multi-chip module (MCM) to couple to a base substrate, comprising:
   a package substrate that is separate from the base substrate;
   a host integrated circuit (IC) chiplet coupled to the package substrate;
   a memory chiplet, comprising:
      storage;
      multiple memory control circuits, each of the multiple memory control circuits to control a memory access operation to the storage, and
      multiple channel circuits, each channel circuit of the multiple channel circuits to transfer channel data between the multiple memory control circuits and the storage at a channel bandwidth;
   multiple links coupling the host IC chiplet to the memory chiplet, each of the multiple links to transfer link data at a link bandwidth that is free to be different than the channel bandwidth; and
   bandwidth balancing circuitry, based on relative values between the channel bandwidth and the link bandwidth, to selectively configure the multiple channel circuits to transfer a total amount of data at a fully-available link bandwidth of the multiple links or to selectively configure the multiple links to transfer the total amount of data at a fully-available channel bandwidth of the multiple channel circuits.

2. The chiplet-based MCM of claim 1, wherein the link bandwidth for each link is greater than the channel bandwidth for each channel circuit, and wherein:
   the bandwidth balancing circuitry resides in the memory chiplet and comprises address mapping circuitry to distribute link data from each link of the multiple links to subsets of the multiple channel circuits.

3. The chiplet-based MCM of claim 2, wherein:
   the address mapping circuitry is configured to dynamically distribute the link data based on a hash function.

4. The chiplet-based MCM of claim 3, wherein the address mapping circuitry further comprises:
   crossbar switch circuitry to route a stream of data from a single input to multiple distributed outputs as distributed data portions; and
   circuitry to attach tag information to the distributed data portions.

5. The chiplet-based MCM of claim 2, wherein:
   the address mapping circuitry is configured to statically distribute the link data based on a predefined address partitioning of the storage into regions.

6. The chiplet-based MCM of claim 1, wherein the link bandwidth for each link is less than the channel bandwidth for each channel circuit, and wherein:

the bandwidth balancing circuitry comprises virtual lane control circuitry to assemble subsets of the multiple links into virtual links, with each of the virtual links transferring the data at a virtual bandwidth that corresponds to the channel bandwidth for each channel circuit.

7. The chiplet-based MCM of claim 1, wherein:

the multiple channel circuits are constrained to operate at the fully-available channel bandwidth; and the bandwidth balancing circuitry activates a number of the multiple links sufficient to transfer the total amount of the data at the fully-available channel bandwidth.

8. A memory chiplet, comprising:

storage;

multiple memory control circuits, each of the multiple memory control circuits to control a memory access operation to the storage, and multiple channel circuits, each channel circuit of the multiple channel circuits to transfer channel data between the multiple memory control circuits and the storage at a channel bandwidth;

multiple link input/output (I/O) circuits coupling the memory chiplet to a host integrated circuit (IC) chiplet, each of the multiple link I/O circuits to transfer link data at a link bandwidth that is free to be different than the channel bandwidth; and bandwidth balancing circuitry, based on relative values between the channel bandwidth and the link bandwidth, to selectively configure the multiple channel circuits to transfer a total amount of data at a fully-available link bandwidth of the multiple link I/O circuits or to selectively configure the multiple link I/O circuits to transfer the total amount of data at a fully-available channel bandwidth of the multiple channel circuits.

9. The memory chiplet of claim 8, wherein the link bandwidth for each of the multiple link I/O circuits is greater than the channel bandwidth for each channel circuit, and wherein:

the bandwidth balancing circuitry comprises address mapping circuitry to distribute link data from each of the multiple link I/O circuits to subsets of the multiple channel circuits.

10. The memory chiplet of claim 9, wherein:

the address mapping circuitry is configured to dynamically distribute the link data based on a hash function.

11. The memory chiplet of claim 10, wherein the address mapping circuitry further comprises:

crossbar switch circuitry to route a stream of the link data from a single input to multiple distributed outputs as distributed data portions; and circuitry to attach tag information to the distributed data portions.

12. The memory chiplet of claim 9, wherein:

the address mapping circuitry is configured to statically distribute the link data based on a predefined address partitioning of the storage into regions.

13. The memory chiplet of claim 8, wherein the link bandwidth for each of the multiple link I/O circuits is less than the channel bandwidth for each channel circuit, and wherein:

the bandwidth balancing circuitry comprises virtual lane control circuitry to assemble subsets of the multiple link I/O circuits into virtual link I/O circuits, with each of the virtual link I/O circuits transferring the link data at a virtual bandwidth that corresponds to the channel bandwidth for each channel circuit.

14. The memory chiplet of claim 8, further comprising:

a network-on-chip (NoC) circuit.

15. A method of operation in a chiplet-based multi-chip module (MCM), the chiplet-based MCM for coupling to a base substrate, and comprising a package substrate that is separate from the base substrate, the MCM comprising a first IC chiplet and a memory chiplet, wherein the memory chiplet comprises storage, multiple memory control circuits and multiple channel circuits, each channel circuit of the multiple channel circuits to transfer channel data between the multiple memory control circuits and the storage at a channel bandwidth, wherein the memory chiplet is coupled to the first IC chiplet by multiple links, each link of the multiple links transferring link data at a link bandwidth, wherein the method comprises:

balancing a total data bandwidth transferred between the multiple channel circuits and the multiple links, the balancing comprising determining a greater one of a channel bandwidth of each channel circuit or a link bandwidth of each link;

if the link bandwidth of each link of the multiple links is greater than the channel bandwidth of each channel circuit of the multiple channel circuits, configuring the multiple channel circuits to transfer a total amount of data at a fully-available link bandwidth of the multiple links; and if the link bandwidth of each link is less than the channel bandwidth of each channel circuit, configuring the multiple links to transfer the total amount of data at a fully-available channel bandwidth of the multiple channel circuits.

16. The method of claim 15, wherein the link bandwidth for each link of the multiple links is greater than the channel bandwidth for each channel circuit of the multiple channel circuits, and wherein:

the balancing comprises, using address mapping circuitry, distributing link data from each link of the multiple links to subsets of the multiple channel circuits.

17. The method of claim 16, wherein:

the balancing comprises dynamically distributing the link data based on a hash function.

18. The method of claim 17, wherein the dynamically distributing further comprises:

routing a stream of data from a single input to multiple distributed outputs as distributed data portions; and attaching tag information to the distributed data portions to reassemble the distributed data portions back into the stream of data at a destination location.

19. The method of claim 16, wherein:

the balancing comprises statically distributing the link data based on a predefined address partitioning of the storage into regions.

20. The method of claim 15, wherein the link bandwidth for each link of the multiple links is less than the channel bandwidth for each channel circuit of the multiple channel circuits, and wherein:

the balancing comprises assembling, with virtual lane control circuitry, subsets of the multiple links into virtual links, with each virtual link transferring the data at a virtual bandwidth that corresponds to the channel bandwidth for each channel circuit of the multiple channel circuits.

* * * * *